United States Patent
Khoshnevisan et al.

(10) Patent No.: US 12,526,096 B2
(45) Date of Patent: Jan. 13, 2026

(54) NON-COHERENT JOINT TRANSMISSION HYPOTHESIS EVALUATION IN MULTI-TRANSMIT RECEIVE POINT DEPLOYMENTS

(71) Applicant: QUALCOMM Incorporated, San Diego, CA (US)

(72) Inventors: Mostafa Khoshnevisan, San Diego, CA (US); Chenxi Hao, Beijing (CN); Xiaoxia Zhang, San Diego, CA (US); Yu Zhang, San Diego, CA (US); Hao Xu, Beijing (CN); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 572 days.

(21) Appl. No.: 17/758,504

(22) PCT Filed: Jan. 31, 2020

(86) PCT No.: PCT/CN2020/074101
§ 371 (c)(1),
(2) Date: Jul. 7, 2022

(87) PCT Pub. No.: WO2021/151241
PCT Pub. Date: Aug. 5, 2021

(65) Prior Publication Data
US 2023/0028703 A1    Jan. 26, 2023

(51) Int. Cl.
*H04W 4/00*       (2018.01)
*H04B 7/024*      (2017.01)
(Continued)

(52) U.S. Cl.
CPC ........... *H04L 5/0048* (2013.01); *H04B 7/024* (2013.01); *H04W 52/325* (2013.01); *H04W 52/36* (2013.01)

(58) Field of Classification Search
CPC ..... H04L 5/0048; H04L 5/0007; H04B 7/024; H04B 7/063; H04W 52/325; H04W 52/36;
(Continued)

(56) References Cited

U.S. PATENT DOCUMENTS 9,544,793 B2 *   1/2017   Liu ...................... H04W 24/08
10,164,747 B2 *  12/2018  Onggosanusi ....... H04B 7/0478
(Continued)

FOREIGN PATENT DOCUMENTS

WO      2019065189 A1    4/2019

OTHER PUBLICATIONS

Supplementary European Search Report—EP20917169—Search Authority—Munich—Sep. 6, 2023.
(Continued)

*Primary Examiner* — Phuongchau Ba Nguyen
(74) *Attorney, Agent, or Firm* — QUALCOMM Incorporated

(57) ABSTRACT

Various aspects of the present disclosure generally relate to wireless communication. In some aspects, a user equipment (UE) may evaluate the plurality of hypotheses based at least in part on the set of power control offset ratios and on a set of evaluation metrics to select at least one of the plurality of hypotheses. Numerous other aspects are provided.

23 Claims, 5 Drawing Sheets

(51) Int. Cl.
*H04L 5/00* (2006.01)
*H04W 52/32* (2009.01)
*H04W 52/36* (2009.01)

(58) Field of Classification Search
CPC ... H04W 28/04; H04W 72/04; H04W 72/042; H04W 88/08; H04W 28/08; H04W 28/084; H04W 36/22; H04W 72/12; H04W 52/40
See application file for complete search history.

(56) References Cited

U.S. PATENT DOCUMENTS

| | | | |
|---|---|---|---|
| 11,552,687 B2 * | 1/2023 | Gao | H04B 7/063 |
| 2013/0003788 A1 * | 1/2013 | Marinier | H04B 7/024 375/219 |
| 2014/0204853 A1 | 7/2014 | Ko et al. | |
| 2014/0328589 A1 * | 11/2014 | Rahman | H04Q 11/0067 398/38 |
| 2015/0003271 A1 * | 1/2015 | Park | H04L 27/2613 370/252 |
| 2015/0085787 A1 | 3/2015 | Ouchi | |
| 2015/0124673 A1 * | 5/2015 | Ouchi | H04W 52/58 |
| 2016/0028448 A1 * | 1/2016 | Park | H04B 7/26 375/267 |
| 2016/0036571 A1 * | 2/2016 | Park | H04L 5/0048 370/330 |
| 2016/0301505 A1 * | 10/2016 | Furuskog | H04W 72/00 |
| 2018/0368075 A1 | 12/2018 | Chen et al. | |
| 2019/0052334 A1 | 2/2019 | Jeon et al. | |
| 2019/0109761 A1 | 4/2019 | Frenne et al. | |
| 2019/0297603 A1 | 9/2019 | Guo et al. | |
| 2022/0077911 A1 * | 3/2022 | Sergeev | H04B 7/0478 |
| 2022/0104214 A1 * | 3/2022 | Ying | H04W 72/1273 |
| 2022/0123847 A1 * | 4/2022 | Ghozlan | H04B 17/318 |
| 2022/0131645 A1 * | 4/2022 | Miao | H04L 1/08 |
| 2023/0198706 A1 * | 6/2023 | Maleki | H04L 5/005 370/329 |
| 2024/0015551 A1 * | 1/2024 | Khoshnevisan | H04L 5/0048 |

OTHER PUBLICATIONS

Intel Corporation: "Remaining Details On UL Power Control Framework", 3GPP TSG RAN WG1 Meeting 90bis, R1-1717408, Prague, CZ, Oct. 9, 2017-Oct. 13, 2017, Oct. 13, 2017 (Oct. 13, 2017), 5 Pages, section 2.

International Search Report and Written Opinion—PCT/CN2020/074101—ISA/EPO—Oct. 27, 2020.

Qualcomm Incorporated: "Remaining Details on SRS", 3GPP Draft, 3GPP TSG RAN WG1 Meeting 90bis, R1-1718549, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 8, 2017 (Oct. 8, 2017), pp. 1-9, XP051341730, Retrieved from the Internet: URL: http://www.3gpp.org/ftp/Meetings_3GPP_SYNC/RAN1/Docs/ [retrieved on Oct. 8, 2017], p. 1-p. 5, Section 3.

* cited by examiner

NON-COHERENT JOINT TRANSMISSION HYPOTHESIS EVALUATION IN MULTI-TRANSMIT RECEIVE POINT DEPLOYMENTS

CROSS-REFERENCE TO RELATED APPLICATION

This patent application is a 371 National Stage of Patent Cooperation Treaty (PCT) Patent Application No. PCT/CN2020/074101, filed on Jan. 31, 2020, entitled "NON-COHERENT JOINT TRANSMISSION HYPOTHESIS EVALUATION IN MULTI-TRANSMIT RECEIVE POINT DEPLOYMENTS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for non-coherent joint transmission (NCJT) hypothesis evaluation in multi-transmit receive point (TRP) deployments.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining, for a plurality of hypotheses associated with a plurality of channel state information (CSI) reference signal (RS) resource pairs, a set of power control offset ratios; and evaluating the plurality of hypotheses based at least in part on the set of power control offset ratios and on a set of evaluation metrics to select at least one of the plurality of hypotheses.

In some aspects, a method of wireless communication, performed by a UE, may include determining, for a plurality of hypotheses associated with a plurality of port group pairs, a set of power control offset ratios; and evaluating the plurality of hypotheses based at least in part on the set of power control offset ratios and a set of evaluation metrics to select at least one of the plurality of hypotheses.

In some aspects, a UE for wireless communication may include a memory and one or more processors operatively coupled to the memory. The memory and the one or more processors may be configured to determine, for a plurality of hypotheses associated with a plurality of CSI RS resource pairs, a set of power control offset ratios; and evaluate the plurality of hypotheses based at least in part on the set of power control offset ratios and on a set of evaluation metrics to select at least one of the plurality of hypotheses.

In some aspects, a UE for wireless communication may include a memory and one or more processors operatively coupled to the memory. The memory and the one or more processors may be configured to determine, for a plurality of hypotheses associated with a plurality of port group pairs, a set of power control offset ratios; and evaluate the plurality of hypotheses based at least in part on the set of power control offset ratios and a set of evaluation metrics to select at least one of the plurality of hypotheses.

In some aspects, a non-transitory computer-readable medium may store one or more instructions for wireless communication. The one or more instructions, when executed by one or more processors of a UE, may cause the one or more processors to determine, for a plurality of hypotheses associated with a plurality of CSI RS resource pairs, a set of power control offset ratios; and evaluate the plurality of hypotheses based at least in part on the set of power control offset ratios and on a set of evaluation metrics to select at least one of the plurality of hypotheses.

In some aspects, a non-transitory computer-readable medium may store one or more instructions for wireless communication. The one or more instructions, when executed by one or more processors of a UE, may cause the one or more processors to determine, for a plurality of hypotheses associated with a plurality of port group pairs, a set of power control offset ratios; and evaluate the plurality of hypotheses based at least in part on the set of power control offset ratios and a set of evaluation metrics to select at least one of the plurality of hypotheses.

In some aspects, an apparatus for wireless communication may include means for determining, for a plurality of hypotheses associated with a plurality of CSI RS resource pairs, a set of power control offset ratios; and means for evaluating the plurality of hypotheses based at least in part on the set of power control offset ratios and on a set of evaluation metrics to select at least one of the plurality of hypotheses.

In some aspects, an apparatus for wireless communication may include means for determining, for a plurality of hypotheses associated with a plurality of port group pairs, a set of power control offset ratios; and means for evaluating the plurality of hypotheses based at least in part on the set of power control offset ratios and a set of evaluation metrics to select at least one of the plurality of hypotheses.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
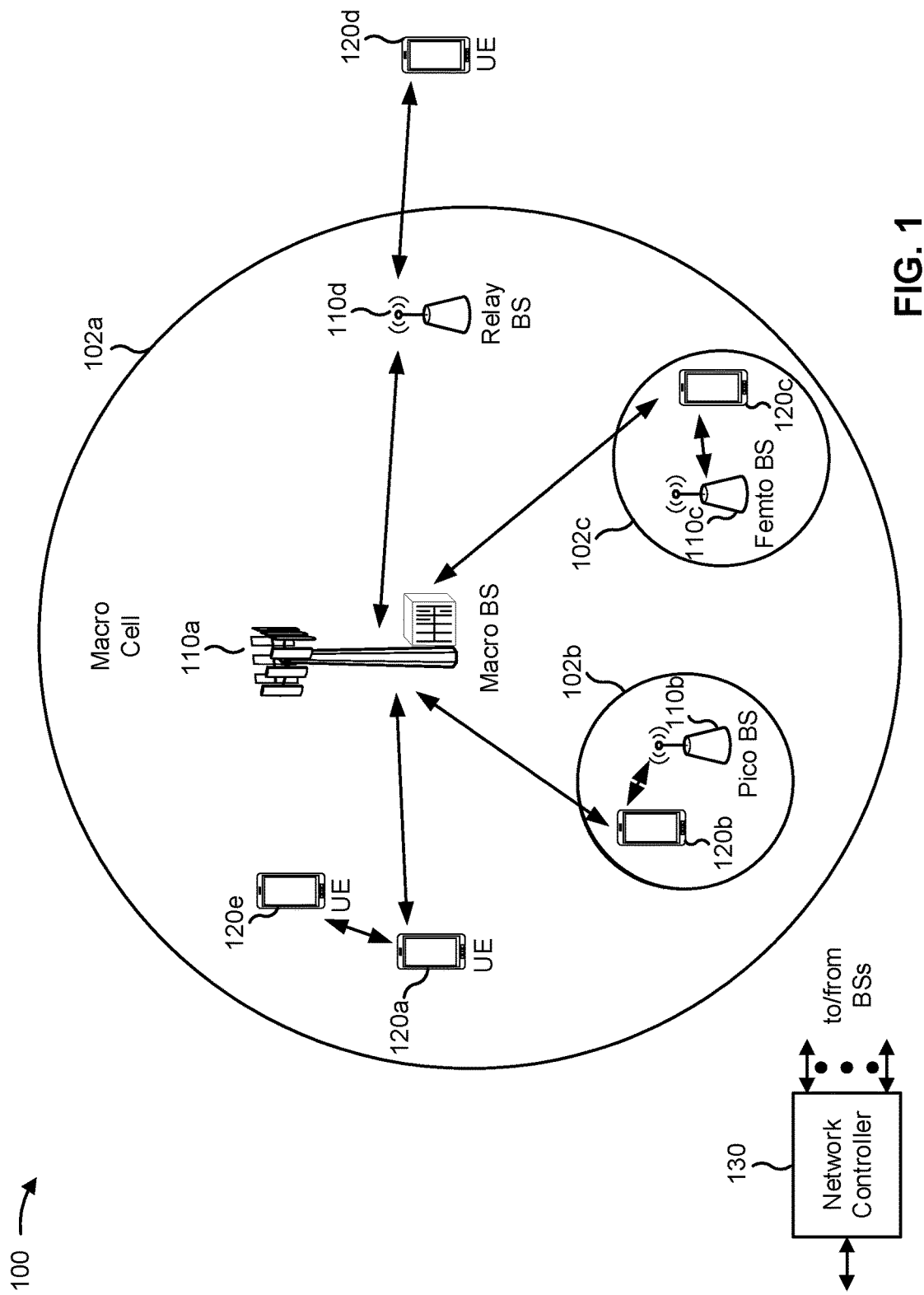
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATS. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
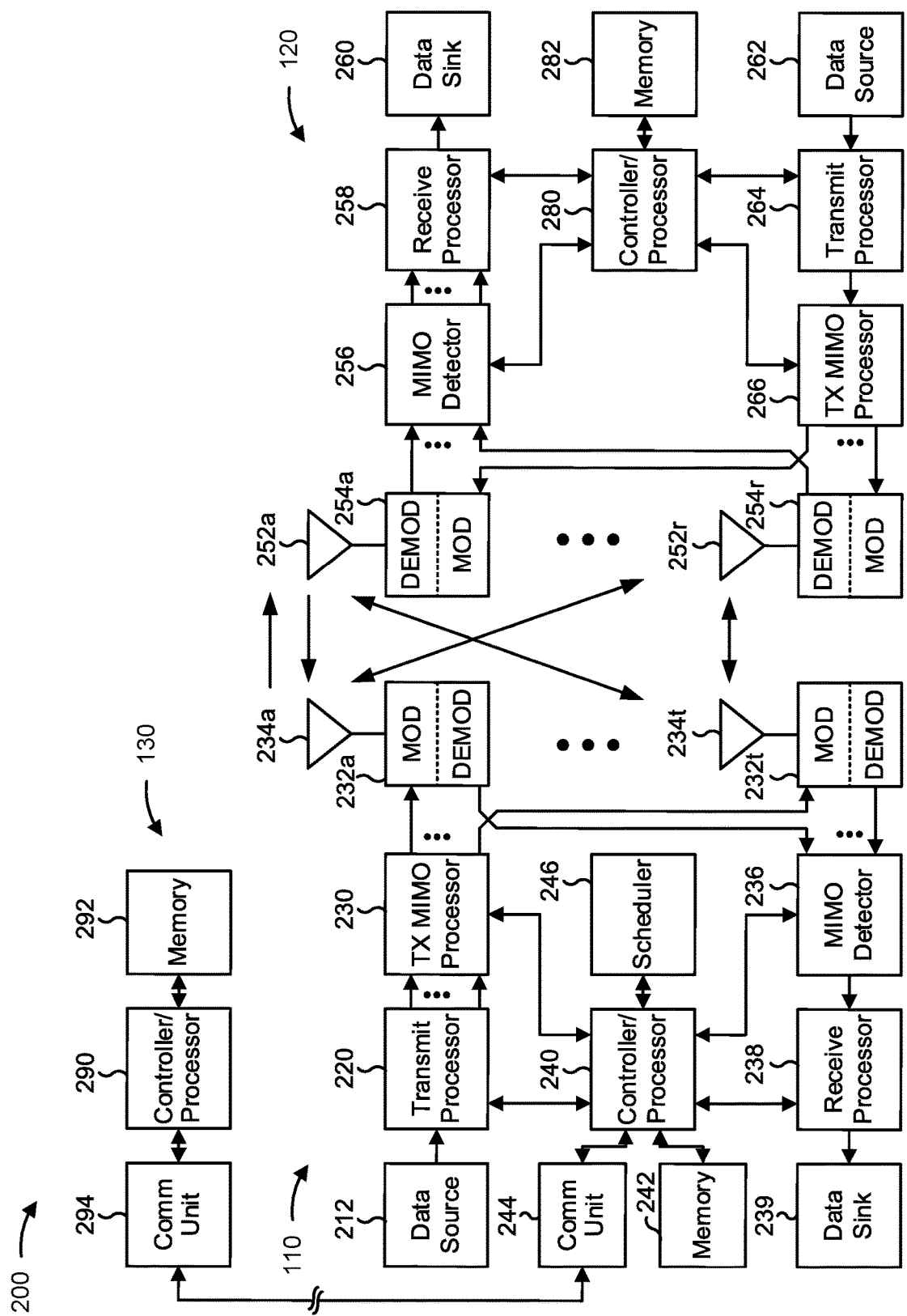
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODS) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with non-coherent joint transmission (NCJT) hypothesis evaluation in multi-transmit receive point (TRP) deployments, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, UE 120 may include means for determining, for a plurality of hypotheses associated with a plurality of channel state information (CSI) reference signal (RS) resource pairs, a set of power control offset ratios, means for evaluating the plurality of hypotheses based at least in part on the set of power control offset ratios and on a set of evaluation metrics to select at least one of the plurality of hypotheses, and/or the like. In some aspects, UE 120 may include means for determining, for a plurality of hypotheses associated with a plurality of port group pairs, a set of power control offset ratios, means for evaluating the plurality of hypotheses based at least in part on the set of power control offset ratios and a set of evaluation metrics to select at least one of the plurality of hypotheses, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In some communications systems, multiple TRPs may communicate with a UE. For example, the UE may communicate with a first TRP, a second TRP, and/or the like, which may enable improved throughput, reliability, coverage, and/or the like. Each TRP may transmit different spatial layers using overlapping resource blocks and/or symbols. For example, the UE may receive one or more first communications from a first TRP and one or more second communications from a second TRP. One or more of the TRPs may indicate a transmission configuration indicator (TCI) field in a downlink control information (DCI) communication. The TCI field in the DCI may indicate two TCI states corresponding to the two TRPs for physical downlink shared channel (PDSCH) transmission (e.g. some layers or demodulation reference signal (DMRS) ports of the PDSCH correspond to a first TCI state and other layers or DMRS ports of the PDSCH correspond to a second TCI state). For example, the first TRP may transmit a physical downlink control channel (PDCCH) communication including a DCI identifying PDSCH DMRS ports for PDSCH communications from the first TRP and the second TRP.

The UE may provide a channel state information (CSI) report to enable communication with one or more TRPs. The CSI report may be a periodic report, a semi-persistent report, or an aperiodic report. The CSI report may report information determined based at least in part on CSI reference signal (RS) resources and interference measurement resources that are configured for the UE. The CSI may include a channel quality indicator (CQI), a precoding matrix indicator (PMI), a CSI RS resource indicator (CRI), a synchronization signal (SS)/physical broadcast channel (PBCH) block resource indicator (SSBRI), a layer indicator (LI), a rank indicator (RI) and/or a layer-1 reference signal received power (L1-RSRP) indicator.

As part of the CSI report, the UE may provide a CRI to identify CSI RS resources that are used for the reported CSI. For example, the UE may provide a CRI, in connection with CSI feedback, that identifies a channel measurement resource (CMR). Each value of the CRI (e.g., a CRI codepoint) identifies a hypothesis for which the UE reports a corresponding CSI. The UE may receive independent CSI reports from each TRP via a separate report configuration. Alternatively, the UE may use dynamic point selection for the CSI reports, whereby each identified resource is associated with a particular transmission configuration indicator (TCI) state corresponding to a particular TRP.

To evaluate a hypothesis to determine the CQI and spectral efficiency for the CSI RS and associated CRI, the UE may determine a power control offset ratio (which may be termed a PC ratio). The power control offset ratio may be based at least in part on a ratio of a PDSCH energy per resource element (EPRE) (e.g., a total energy of PDSCH ports multiplexed on a single subcarrier of a single OFDM symbol) to a CSI RS EPRE (e.g., a total energy of CSI RS ports multiplexed on a single subcarrier of a single OFDM symbol). The power control offset ratio may be configured for each CSI RS resource. However, in multi-TRP deployments, the UE may be associated with multiple DMRS ports associated with the plurality of TRPs.

A first CSI framework may enable the UE to select a report corresponding to a preferred TRP or a preferred TRP pair. In such a CSI framework, report configuration may identify one or more single-TCI state (e.g. single-TRP) hypotheses each corresponding to a single CSI-Rs resource, or one or more NCJT (e.g. multi-TRP) hypotheses corresponding to a CSI-RS resource pair for channel measurement, and/or the like. In some cases, each resource may be associated with a single TCI state. The CRI may include a first indicator to identify single TRP report (e.g., CRI values of 0 or 1 corresponding to CSI-RS resource 0 or CSI-RS resource 1, respectively) and a second indicator to identify multi-TRP report (e.g., a CRI value of 2 corresponding to both CSI-RS resource 0 and CSI-RS resource 1).

A second CSI framework may also enable the UE to select and report a preferred TRP or TRP pair. In such a CSI framework, report configuration may identify a non-coherent joint transmission (NCJT) hypothesis corresponding to a port group pair associated with a common resource for channel measurement denoted by a type-1 resource. In this case, each port group of the port group pair may be associated with a single TCI state (the resource is associated with two TCI states). In some cases, each resource may be associated with a single TCI state corresponding to a single port group (e.g., not configured with a port group pair). Such resources may be denoted by type-0 resources. The RI may include a first rank indicator to identify single TRP operation (e.g., RI values greater than 1 for a first port group and an RI value of 0 for a second port group) and a second rank indicator to identify multi-TRP operation (e.g., a RI value of greater than 0 for both port groups).

When each hypothesis associated with each resource is associated with the same type (e.g., all hypotheses are single-TRP operation hypotheses or all hypotheses are multi-TRP operation hypotheses), the UE may evaluate the plurality of different hypotheses using the same determined power control offset ratios. However, when the hypotheses are of different types (e.g., some hypotheses are single-TRP operation hypotheses and some hypotheses are multi-TRP operation hypotheses), power differences between operation states may result in evaluation issues.

Some aspects described herein enable a determination of a power control offset ratio for a hypothesis. Moreover, some aspects enable an evaluation of a set of hypotheses in a multi-TRP deployment. For example, the UE may apply an evaluation metric to compensate for additional transmit power associated with NCJT hypotheses, thereby enabling comparison between single-TRP operation hypotheses and multi-TRP operation hypotheses. In this way, the UE enables improved communication in multi-TRP deployments.

Figure 3:
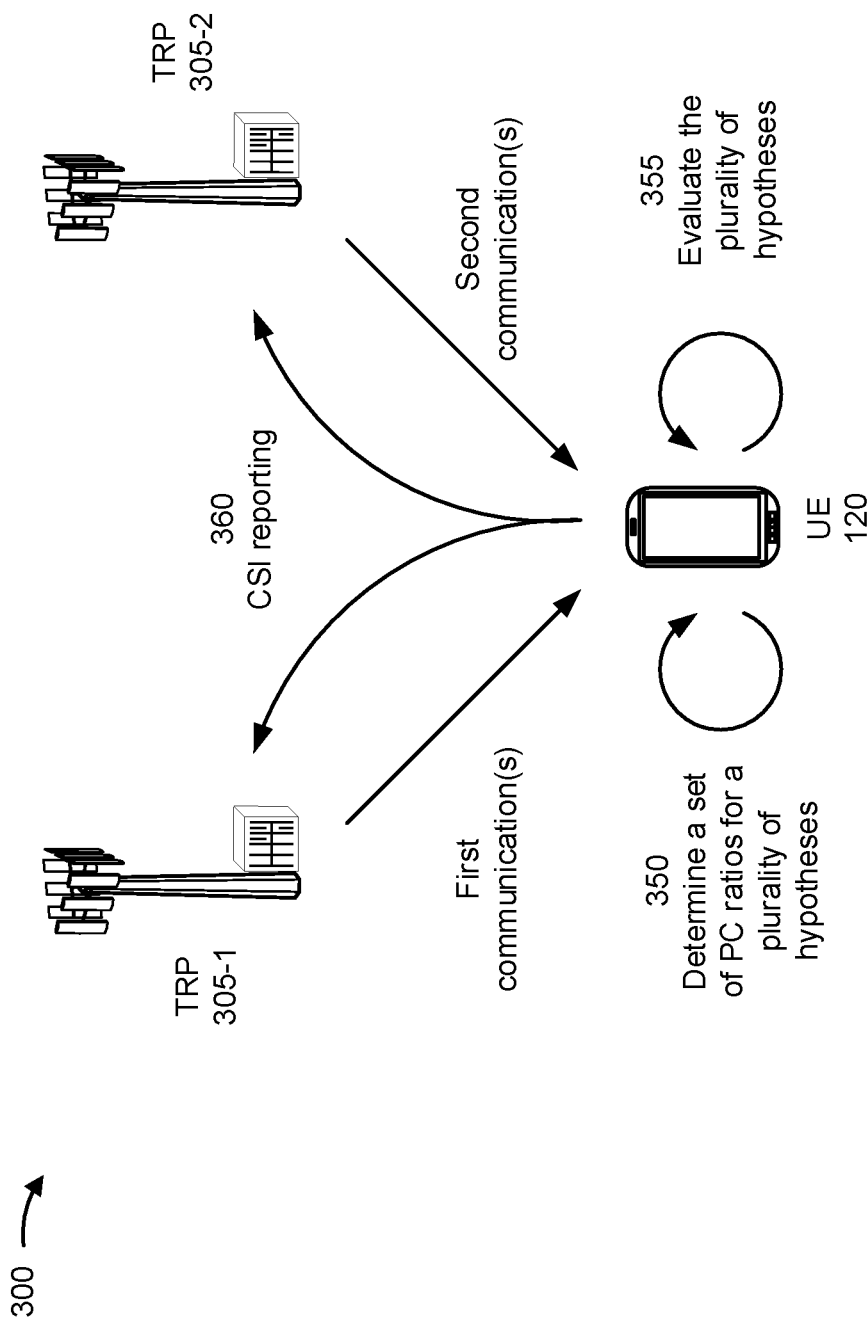
FIG. 3 is a diagram illustrating an example of non-coherent joint transmission hypothesis evaluation in multi-transmit receive point deployments, in accordance with various aspects of the present disclosure.

FIG. 3 is a diagram illustrating an example 300 of NCJT hypothesis evaluation in multi-TRP deployments, in accordance with various aspects of the present disclosure. As shown in FIG. 3, example 300 includes a UE 120 and a set of TRPs 305, such as a first TRP 305-1 and a second TRP 305-2. In some aspects, UE 120 may communicate with the set of TRPs 305. For example, first TRP 305-1 may transmit a physical downlink shared channel (PDSCH) communication, a physical downlink control channel (PDCCH) communication, and/or the like to UE 120. In this case, a first subset of DMRS ports, $v_1$, may be associated with a first port group and a first TCI state and a second subset of DMRS ports, $v_2$, may be associated with a second port group and a second TCI state. UE 120 may support rank combinations $(v_1, v_2)$ (e.g., combinations (1, 1), (1, 2), (2, 1), and (2, 2)) and communicate each data resource element using $v_1+v_2$ layers.

As further shown in FIG. 3, and by reference number 350, UE 120 may determine a set of power control offset ratios for a plurality of hypotheses. For example, for NCJT hypotheses associated with a resource pair and for a rank hypothesis $(v_1, v_2)$, UE 120 may determine the set of power control offset ratios based at least in part on a ratio of a PDSCH power to a CSI RS power, such that the PDSCH power is based at least in part on a total energy of $(v_1+v_2)$ PDSCH ports multiplexed on a single subcarrier of a single OFDM symbol. In some aspects, the CSI RS power is based at least in part on a total of the energy of all CSI RS ports multiplexed on a single subcarrier of a single OFDM symbol in a first resource and the energy of all CSI RS ports multiplexed on a single subcarrier of a single OFDM symbol in a second resource. Alternatively, the CSI RS power is based at least in part on an average of the energy of all CSI RS ports multiplexed on a single subcarrier of a single OFDM symbol in a first resource and the energy of all CSI RS ports multiplexed on a single subcarrier of a single OFDM symbol in a second resource.

In some aspects, UE 120 may determine the power control offset ratio based at least in part on a set of power control offset ratio components. For example, a first component, $c_1$, of the power control offset ratio may be based at least in part on a ratio of PDSCH power for $v_1$ PDSCH ports relative to a CSI RS power in a first resource. Similarly, a second component, $c_2$, of the power control offset ratio may be based at least in part on a ratio of PDSCH power for $v_2$ PDSCH ports relative to a CSI RS power in a second resource. In this case, the power control offset ratio may be defined as $(c_1, c_2)$.

In some aspects, UE 120 may receive radio resource control (RRC) signaling configuring the power control offset ratio. For example, UE 120 may receive RRC signaling configuring the power control offset ratio for each hypothesis, each CRI, and/or each resource pair. Additionally, or alternatively, UE 120 may receive a CSI report configuration message identifying the power control offset ratio. In some aspects, UE 120 may receive information identifying a second power control offset ratio for each CSI RS resource for use in CSI RS resources included in a resource pair of an NCJT hypothesis. In this case, TRPs 305 may configure the power control offset values to compensate for transmission power differences associated with NCJT transmission, as described above. Alternatively, UE 120 may determine the power control offset ratio for resource pairs based at least in part on single-TRP operation hypothesis power control offset ratios and based at least in part on an evaluation metric. In this case, the evaluation metric may be a fixed or configurable value to account for transmission power differences associated with NCJT transmission.

In some aspects, for NCJT hypotheses associated with port group pairing in a CSI RS resource and for a rank hypothesis ($v_1$, $v_2$), UE 120 may determine the power control offset ratio based at least in part on a ratio of a PDSCH power to a CSI RS power, such that the CSI RS power is based at least in part on a set of port groups. For example, UE 120 may determine the CSI RS power as a total energy of all CSI RS ports multiplexed on a single subcarrier of a single OFDM symbol in a first port group and all CSI RS ports multiplexed on a single subcarrier of a single OFDM symbol in a second port group. Alternatively, UE 120 may determine the CSI RS power as an average energy of all CSI RS ports multiplexed on a single subcarrier of a single OFDM symbol in a first port group and all CSI RS ports multiplexed on a single subcarrier of a single OFDM symbol in a second port group. Alternatively, UE 120 may determine the CSI RS power as the energy of all CSI RS ports multiplexed on a single subcarrier of a single OFDM symbol without respect to port group.

In some aspects, UE 120 may determine the power control offset ratio based at least in part on a set of power control offset ratio components for the set of port group pairs. For example, UE 120 may determine the power control offset ratio as ($c_1$, $c_2$) as described above, such that a CSI RS power of $c_1$ is based at least in part on an energy of all CSI RS ports multiplexed on a single subcarrier of a single OFDM symbol in a first port group and a CSI RS power of $c_2$ is based at least in part on an energy of all CSI RS ports multiplexed on a single subcarrier of a single OFDM symbol in a second port group.

In some aspects, for port group pairs, UE 120 may receive RRC signaling configuring the power control offset ratio. For example, UE 120 may receive a single power control offset ratio for each CSI RS resource in RRC signaling. In this case, the single power control offset ratio may be used for single-TRP operation hypotheses (e.g., of a first port group or a second port group), and UE 120 may determine the power control offset ratio for NCJT hypotheses (e.g. corresponding to both port groups) based at least in part on an evaluation factor, as described above. Additionally, or alternatively, UE 120 may receive a first power control offset ratio for a first port group and a second power control offset ratio for a second port group, and may determine the power control offset ratio based at least in part on the evaluation factor. Additionally, or alternatively, UE 120 may receive a first power control offset ratio applying to a first port group, a second power control offset ratio applying to a second port group, and a third power control offset ratio applying to a port group pair (e.g., that includes the first port group and the second port group).

As further shown in FIG. 3, and by reference number 355, UE 120 may evaluate the plurality of hypotheses. For example, UE 120 may evaluate the plurality of hypotheses using the power control offset values to determine, for each hypothesis group into which the plurality of hypotheses is divided, a best one or more hypotheses. In this case, UE 120 may determine the best one or more hypotheses based at least in part on a highest spectral efficiency associated with a CQI value.

As further shown in FIG. 3, and by reference number 360, UE 120 may provide one or more CSI reports. For example, UE 120 may provide one or more CSI reports corresponding to one or more hypothesis groups based at least in part on evaluating the plurality of hypotheses to determine, for each hypothesis group, a best one or more hypotheses. In this way, UE 120 enables subsequent communication with TRPs 305.

As indicated above, FIG. 3 is provided as an example. Other examples may differ from what is described with respect to FIG. 3.

Figure 4:
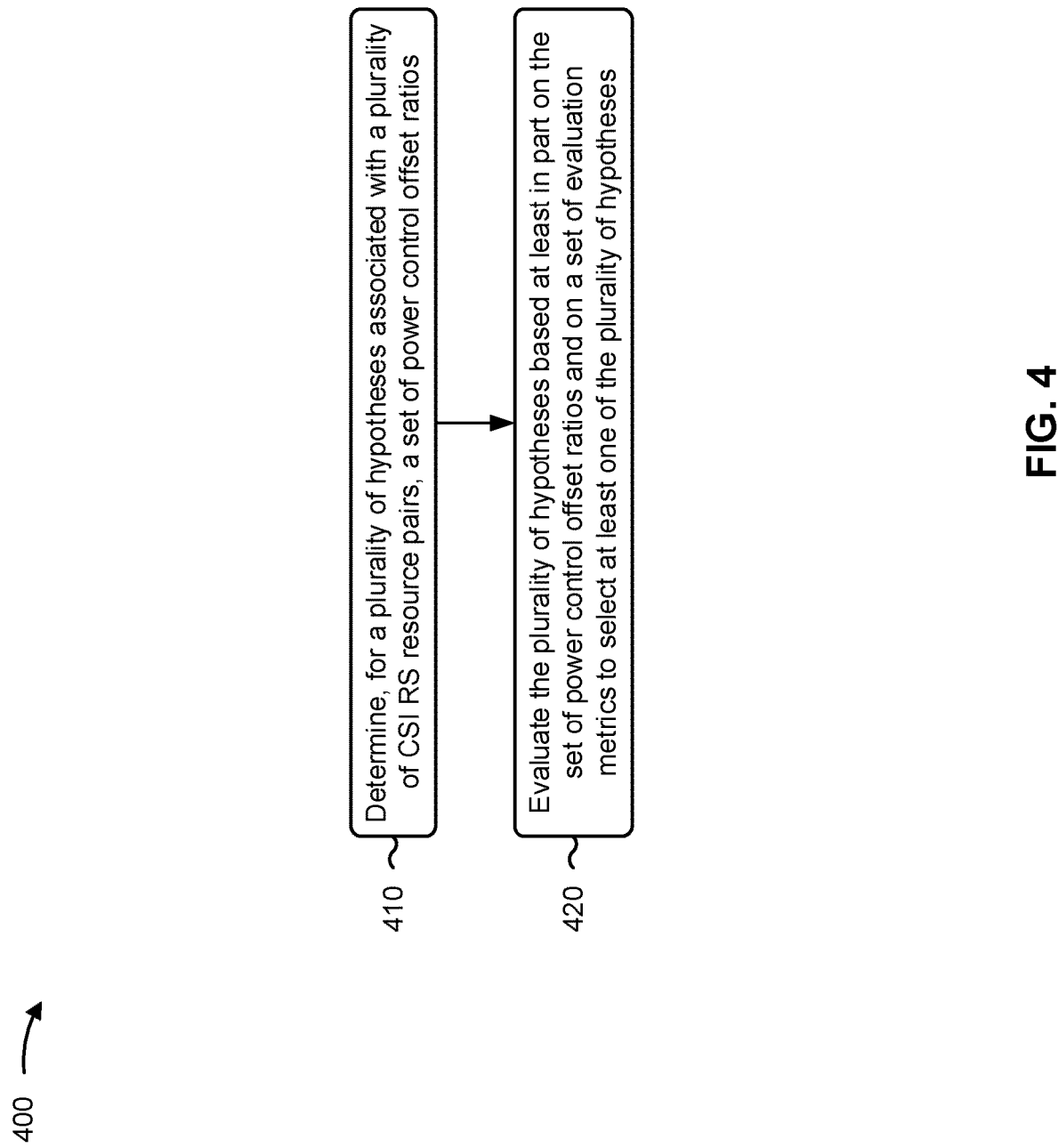
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with NCH hypothesis evaluation in multi-TRP deployments.

As shown in FIG. 4, in some aspects, process 400 may include determining, for a plurality of hypotheses associated with a plurality of channel state information (CSI) reference signal (RS) resource pairs, a set of power control offset ratios (block 410). For example, the UE (e.g., using receive processor 258, transmit processor 264, controller/processor 280, memory 282, and/or the like) may determine, for a plurality of hypotheses associated with a plurality of channel state information (CSI) reference signal (RS) resource pairs, a set of power control offset ratios, as described above.

As further shown in FIG. 4, in some aspects, process 400 may include evaluating the plurality of hypotheses based at least in part on the set of power control offset ratios and on a set of evaluation metrics to select at least one of the plurality of hypotheses (block 420). For example, the UE (e.g., using receive processor 258, transmit processor 264, controller/processor 280, memory 282, and/or the like) may evaluate the plurality of hypotheses based at least in part on the set of power control offset ratios and on a set of evaluation metrics to select at least one of the plurality of hypotheses, as described above.

Process 400 may include additional aspects, such as any single aspect or any combination of aspects described below and/or in connection with one or more other processes described elsewhere herein.

In a first aspect, an evaluation metric, of the set of evaluations metrics, is based at least in part on at least one of a quantity of transmit receive points of a hypothesis corresponding to a particular power control offset ratio of the evaluation metric.

In a second aspect, alone or in combination with the first aspect, a power control offset ratio, of the set of power control offset ratios, is based at least in part on a physical downlink shared channel power and a CSI RS power.

In a third aspect, alone or in combination with one or more of the first and second aspects, the physical downlink shared channel power is based at least in part on a total physical downlink shared channel power of a plurality of physical downlink shared channel ports multiplexed onto a single carrier of a single orthogonal frequency division multiplexing symbol.

In a fourth aspect, alone or in combination with one or more of the first through third aspects, the CSI RS power is based at least in part on a total energy of a plurality of CSI RS ports multiplexed onto a single subcarrier of a single orthogonal frequency division multiplexing symbol in a first resource, of a resource pair of the plurality of CSI RS resource pairs, and in a second resource of the resource pair.

In a fifth aspect, alone or in combination with one or more of the first through fourth aspects, the CSI RS power is based at least in part on an average energy of a plurality of CSI RS ports multiplexed onto a single subcarrier of a single orthogonal frequency division multiplexing symbol in a first resource, of a resource pair of the plurality of CSI RS resource pairs, and in a second resource of the resource pair.

In a sixth aspect, alone or in combination with one or more of the first through fifth aspects, a power control offset ratio, of the set of power control offset ratios, includes a first component based at least in part on a physical downlink shared channel power of a first set of ports and a CSI RS power of a first resource and a second component based at least in part on a physical downlink shared channel power of a second set of ports and a CSI RS power of a second resource.

In a seventh aspect, alone or in combination with one or more of the first through sixth aspects, first set of ports corresponds to a first rank hypothesis in the first resource and the second set of ports corresponds to a second rank hypothesis in the second resource.

In an eighth aspect, alone or in combination with one or more of the first through seventh aspects, the physical downlink shared channel power of the first set of ports is based at least in part on a total physical downlink shared channel power of a plurality of physical downlink shared channel ports in the first set of ports multiplexed onto a single carrier of a single orthogonal frequency division multiplexing symbol on the first set of ports, and the physical downlink shared channel power of the second set of ports is based at least in part on a total physical downlink shared channel power of the plurality of physical downlink shared channel ports in the second set of ports multiplexed onto the single carrier of the single orthogonal frequency division multiplexing symbol on the second set of ports.

In a ninth aspect, alone or in combination with one or more of the first through eighth aspects, the CSI RS power of the first resource is based at least in part on a total energy of a plurality of CSI RS ports multiplexed onto a single subcarrier of a single orthogonal frequency division multiplexing symbol in a first resource, of a resource pair of the plurality of CSI RS resource pairs, and the CSI RS power of the second resource is based at least in part on a total energy of a plurality of CSI RS ports multiplexed onto the single subcarrier of the single orthogonal frequency division multiplexing symbol in a second resource of the resource pair.

In a tenth aspect, alone or in combination with one or more of the first through ninth aspects, power control offset ratios, of the set of power control offset ratios, are configured on a per hypothesis basis based at least in part on radio resource control signaling.

In an eleventh aspect, alone or in combination with one or more of the first through tenth aspects, power control offset ratios, of the set of power control offset ratios, are configured on a per CSI RS resource basis and based at least in part on a scaling factor.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
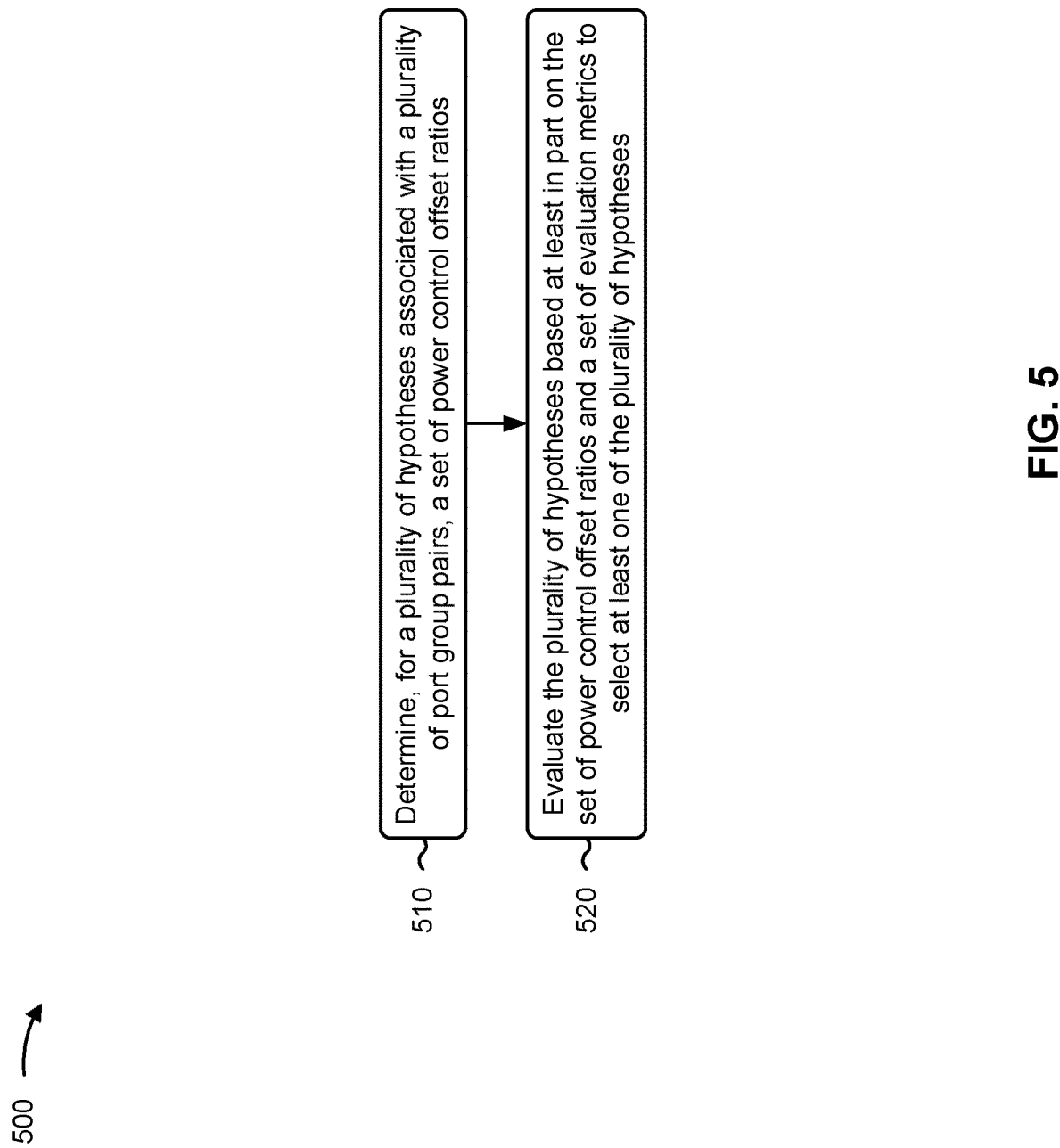
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 and/or the like) performs operations associated with NCJT hypothesis evaluation in multi-TRP deployments.

As shown in FIG. 5, in some aspects, process 500 may include determining, for a plurality of hypotheses associated with a plurality of port group pairs, a set of power control offset ratios (block 510). For example, the UE (e.g., using receive processor 258, transmit processor 264, controller/processor 280, memory 282, and/or the like) may determine, for a plurality of hypotheses associated with a plurality of port group pairs, a set of power control offset ratios, as described above.

As further shown in FIG. 5, in some aspects, process 500 may include evaluating the plurality of hypotheses based at least in part on the set of power control offset ratios and a set of evaluation metrics to select at least one of the plurality of hypotheses (block 520). For example, the UE (e.g., using receive processor 258, transmit processor 264, controller/processor 280, memory 282, and/or the like) may evaluate the plurality of hypotheses based at least in part on the set of power control offset ratios and a set of evaluation metrics to select at least one of the plurality of hypotheses, as described above.

Process 500 may include additional aspects, such as any single aspect or any combination of aspects described below and/or in connection with one or more other processes described elsewhere herein.

In a first aspect, an evaluation metric, of the set of evaluations metrics, is based at least in part on at least one of a quantity of transmit receive points of a hypothesis corresponding to a particular power control offset ratio of the evaluation metric.

In a second aspect, alone or in combination with the first aspect, a power control offset ratio, of the set of power control offset ratios, is based at least in part on a physical downlink shared channel power and a CSI RS.

In a third aspect, alone or in combination with one or more of the first and second aspects, the physical downlink shared channel power is based at least in part on a total physical downlink shared channel power of a plurality of physical downlink shared channel ports multiplexed onto a single carrier of a single orthogonal frequency division multiplexing symbol.

In a fourth aspect, alone or in combination with one or more of the first through third aspects, the CSI RS power is based at least in part on a total energy of a plurality of CSI RS ports multiplexed onto a single subcarrier of a single orthogonal frequency division multiplexing symbol in a first port group, of a port group pair of the plurality of port group pairs, and in a second port group of the port group pair.

In a fifth aspect, alone or in combination with one or more of the first through fourth aspects, the CSI RS power is based at least in part on an average energy of a plurality of CSI RS ports multiplexed onto a single subcarrier of a single orthogonal frequency division multiplexing symbol in a first port group, of a port group pair of the plurality of port group pairs, and in a second port group of the port group pair.

In a sixth aspect, alone or in combination with one or more of the first through fifth aspects, a power control offset ratio, of the set of power control offset ratios, includes a first component based at least in part on a physical downlink shared channel power of a first set of ports and a channel state information (CSI) reference signal (RS) power of a first port group of a port group pair and a second component based at least in part on a physical downlink shared channel power of a second set of ports and a CSI RS power of a second port group of the port group pair.

In a seventh aspect, alone or in combination with one or more of the first through sixth aspects, first set of ports corresponds to a first rank hypothesis in the first resource and the second set of ports corresponds to a second rank hypothesis in the second resource.

In an eighth aspect, alone or in combination with one or more of the first through seventh aspects, the physical downlink shared channel power of the first set of ports is based at least in part on a total physical downlink shared channel power of a plurality of physical downlink shared channel ports multiplexed onto a single carrier of a single orthogonal frequency division multiplexing symbol on the first set of ports, the physical downlink shared channel power of the second set of ports is based at least in part on a total physical downlink shared channel power of the plurality of physical downlink shared channel ports in the second set of ports multiplexed onto the single carrier of the single orthogonal frequency division multiplexing symbol on the second set of ports.

In a ninth aspect, alone or in combination with one or more of the first through eighth aspects, the CSI RS power of the first port group is based at least in part on a total energy of a plurality of CSI RS ports in the first port group multiplexed onto a single subcarrier of a single orthogonal frequency division multiplexing symbol, and the CSI RS power of the second resource is based at least in part on a total energy of a plurality of CSI RS ports in the second port group multiplexed onto the single subcarrier of the single orthogonal frequency division multiplexing symbol.

In a tenth aspect, alone or in combination with one or more of the first through ninth aspects, power control offset ratios, of the set of power control offset ratios, are configured on a per CSI RS resource basis based at least in part on radio resource control signaling.

In an eleventh aspect, alone or in combination with one or more of the first through tenth aspects, a quantity of power control offset ratios configured for a hypothesis is one of a single power control offset ratio applying to a first port group and a second port group and an offset value applying to a port group pair including of the first port group and the second port group, a first power control offset ratio applying to a first port group, a second power control offset ratio applying to a second port group, and an offset value applying to a port group pair including of the first port group and the second port group, or a first power control offset ratio applying to a port group, a second power control offset ratio applying to a second port group, and a third power control offset ratio applying to a port group pair consisting of the first port group and the second port group.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining, for a set of hypotheses associated with a set of channel state information (CSI) reference signal (RS) resource pairs, a set of power control offset ratios; and
    evaluating the set of hypotheses based at least in part on the set of power control offset ratios, wherein a power control offset ratio, of the set of power control offset ratios, includes a first component based at least in part on a physical downlink shared channel power of a first set of ports and a CSI RS power of a first resource and a second component based at least in part on a physical downlink shared channel power of a second set of ports and a CSI RS power of a second resource.

2. The method of claim 1, wherein evaluating the set of hypotheses comprises:
evaluating the set of hypotheses based at least in part on a set of evaluation metrics, wherein an evaluation metric, of the set of evaluations metrics, is based at least in part on at least one of a quantity of transmit receive points of a hypothesis corresponding to a particular power control offset ratio of the evaluation metric.

3. The method of claim 1, wherein the power control offset ratio, of the set of power control offset ratios, is based at least in part on a ratio of an other physical downlink shared channel power to a CSI RS power.

4. The method of claim 3, wherein the physical downlink shared channel power is based at least in part on a total physical downlink shared channel power of a set of physical downlink shared channel ports multiplexed onto a single carrier of a single orthogonal frequency division multiplexing symbol.

5. The method of claim 3, wherein the CSI RS power is based at least in part on a total energy of a set of CSI RS ports multiplexed onto a single subcarrier of a single orthogonal frequency division multiplexing symbol in a first resource, of a resource pair of the set of CSI RS resource pairs, and in a second resource of the resource pair.

6. The method of claim 3, wherein the CSI RS power is based at least in part on an average energy of a set of CSI RS ports multiplexed onto a single subcarrier of a single orthogonal frequency division multiplexing symbol in a first resource, of a resource pair of the set of CSI RS resource pairs, and in a second resource of the resource pair.

7. The method of claim 1, wherein a set of physical downlink shared channel ports in the first set of ports are multiplexed onto a carrier of an orthogonal frequency division multiplexing symbol on the first set of ports.

8. The method of claim 1, wherein the first set of ports corresponds to a first rank hypothesis in the first resource and the second set of ports corresponds to a second rank hypothesis in the second resource.

9. The method of claim 1, wherein the physical downlink shared channel power of the first set of ports is based at least in part on a total physical downlink shared channel power of a set of physical downlink shared channel ports in the first set of ports multiplexed onto a single carrier of a single orthogonal frequency division multiplexing symbol on the first set of ports, and
wherein the physical downlink shared channel power of the second set of ports is based at least in part on a total physical downlink shared channel power of a set of physical downlink shared channel ports in the second set of ports multiplexed onto the single carrier of the single orthogonal frequency division multiplexing symbol on the second set of ports.

10. The method of claim 1, wherein the CSI RS power of the first resource is based at least in part on a total energy of a set of CSI RS ports multiplexed onto a single subcarrier of a single orthogonal frequency division multiplexing symbol in a first resource, of a resource pair of the set of CSI RS resource pairs, and wherein the CSI RS power of the second resource is based at least in part on the total energy of the set of CSI RS ports multiplexed onto a single subcarrier of a single orthogonal frequency division multiplexing symbol in a second resource of the resource pair.

11. The method of claim 1, wherein power control offset ratios, of the set of power control offset ratios, are configured on a per hypothesis basis based at least in part on radio resource control signaling.

12. The method of claim 1, wherein power control offset ratios, of the set of power control offset ratios, are configured on a per CSI RS resource basis and based at least in part on a scaling factor.

13. The method of claim 1, further comprising:
transmitting one or more CSI reports based at least in part on evaluating the set of hypotheses.

14. The method of claim 1, wherein evaluating the set of hypotheses comprises:
evaluating the set of hypotheses to select at least one of the set of hypotheses.

15. A user equipment (UE) for wireless communication, comprising:
one or more memories; and
one or more processors coupled to the one or more memories, the one or more memories and the one or more processors configured to:
determine, for a set of hypotheses associated with a set of channel state information (CSI) reference signal (RS) resource pairs, a set of power control offset ratios; and
evaluate the set of hypotheses based at least in part on the set of power control offset ratios to select at least one of the set of hypotheses, wherein a power control offset ratio, of the set of power control offset ratios, includes a first component based at least in part on a physical downlink shared channel power of a first set of ports and a CSI RS power of a first resource and a second component based at least in part on a physical downlink shared channel power of a second set of ports and a CSI RS power of a second resource.

16. A non-transitory computer-readable medium storing a set of instructions for wireless communication, the set of instructions comprising:
one or more instructions that, when executed by one or more processors of a user equipment (UE), cause the UE to:
determine, for a set of hypotheses associated with a set of channel state information (CSI) reference signal (RS) resource pairs, a set of power control offset ratios; and
evaluate the set of hypotheses based at least in part on the set of power control offset ratios, wherein a power control offset ratio, of the set of power control offset ratios, includes a first component based at least in part on a physical downlink shared channel power of a first set of ports and a CSI RS power of a first resource and a second component based at least in part on a physical downlink shared channel power of a second set of ports and a CSI RS power of a second resource.

17. The non-transitory computer-readable medium of claim 16, wherein a set of physical downlink shared channel ports in the first set of ports are multiplexed onto a carrier of an orthogonal frequency division multiplexing symbol on the first set of ports.

18. The non-transitory computer-readable medium of claim 16, wherein the first set of ports corresponds to a first rank hypothesis in the first resource and the second set of ports corresponds to a second rank hypothesis in the second resource.

19. The non-transitory computer-readable medium of claim 16, wherein the one or more instructions, that cause the UE to evaluate the set of hypotheses, cause the UE to:
evaluate the set of hypotheses to select at least one of the set of hypotheses.

20. An apparatus for wireless communication, comprising:
- means for determining, for a set of hypotheses associated with a set of channel state information (CSI) reference signal (RS) resource pairs, a set of power control offset ratios; and
- means for evaluating the set of hypotheses based at least in part on the set of power control offset ratios, wherein a power control offset ratio, of the set of power control offset ratios, includes a first component based at least in part on a physical downlink shared channel power of a first set of ports and a CSI RS power of a first resource and a second component based at least in part on a physical downlink shared channel power of a second set of ports and a CSI RS power of a second resource.

21. The apparatus of claim 20, wherein a set of physical downlink shared channel ports in the first set of ports are multiplexed onto a carrier of an orthogonal frequency division multiplexing symbol on the first set of ports.

22. The apparatus of claim 20, wherein the first set of ports corresponds to a first rank hypothesis in the first resource and the second set of ports corresponds to a second rank hypothesis in the second resource.

23. The apparatus of claim 20, wherein the means for evaluating the set of hypotheses comprises:
- means for evaluating the set of hypotheses to select at least one of the set of hypotheses.

* * * * *